(12) United States Patent
Arai (10) Patent No.: US 8,203,762 B2
(45) Date of Patent: Jun. 19, 2012

(54) IMAGE READING DEVICE, IMAGE READING METHOD AND READING CONTROL PROGRAM

(75) Inventor: Tomomi Arai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 704 days.

(21) Appl. No.: 12/361,745

(22) Filed: Jan. 29, 2009

(65) Prior Publication Data

US 2009/0195841 A1 Aug. 6, 2009

(30) Foreign Application Priority Data

Jan. 31, 2008 (JP) ............................... 2008-020806

(51) Int. Cl.
*H04N 1/00* (2006.01)
*H04N 1/04* (2006.01)
(52) U.S. Cl. ......... 358/403; 358/444; 358/468; 358/474
(58) Field of Classification Search .................. 358/403, 358/444, 468, 47; 382/305, 306
See application file for complete search history.

(56) References Cited

U.S. PATENT DOCUMENTS

| 6,867,881 | B1 | 3/2005 | Umezato |
| 2006/0012833 | A1 | 1/2006 | Ito et al. |
| 2006/0126113 | A1 | 6/2006 | Narazaki |

FOREIGN PATENT DOCUMENTS

| JP | 02-071664 | | 3/1990 |
| JP | 08-293946 | | 11/1996 |
| JP | 09-238255 | | 9/1997 |
| JP | 11-289416 | | 10/1999 |
| JP | 2000-131773 | | 5/2000 |
| JP | 2002-118708 | | 4/2002 |
| JP | 2003-046734 | | 2/2003 |
| JP | 2003-229984 | A | 8/2003 |
| JP | 2003-283776 | A | 10/2003 |
| JP | 2004-080336 | | 3/2004 |
| JP | 2005-142987 | | 6/2005 |
| JP | 2005-142987 | A | 6/2005 |
| JP | 2005142987 | A * | 6/2005 |
| JP | 2005-236660 | | 9/2005 |
| JP | 2005-333185 | A | 12/2005 |
| JP | 2006-054842 | | 2/2006 |
| JP | 2006-253941 | | 9/2006 |
| JP | 2007-074124 | A | 3/2007 |

OTHER PUBLICATIONS

European Search Report; Application No. 09001109.9-1522 dated Apr. 29, 2009.
Office Action for corresponding European Patent Application 09 001 109.9-1522 dated Jul. 6, 2011.
Notification of Reasons for Refusal for Japanese Application No. 2008-020806 mailed Feb. 16, 2010.

* cited by examiner

*Primary Examiner* — Cheukfan Lee
(74) *Attorney, Agent, or Firm* — Banner & Witcoff, Ltd.

(57) ABSTRACT

An image reading device is provided. The image reading device includes: a reading unit which reads an original while the reading unit and the original are relatively moved, to produce a plurality of image data based on a plurality of producing conditions, respectively, in response to a reading command input one time, the plurality of producing conditions being different mutually; and a storing unit which stores the plurality of image data produced by the reading unit in a same storing destination.

15 Claims, 8 Drawing Sheets

| PRIORITY | RESOLUTION | COLOR SETTING | READING RANGE | DATA FORMAT | ESTIMATED DATA AMOUNT |
|---|---|---|---|---|---|
| 1 | 400dpi | MONOCHROME | A4 | PDF | 200 |
| 2 | 400dpi | MONOCHROME | A4 | TIFF | 300 |
| 3 | 400dpi | MONOCHROME | A5 | PDF | 100 |
| 4 | 400dpi | MONOCHROME | A5 | TIFF | 150 |
| ... | ... | ... | ... | ... | ... |
| 13 | 200dpi | COLOR | A4 | PDF | 500 |
| 14 | 200dpi | COLOR | A4 | TIFF | 1000 |
| 15 | 200dpi | COLOR | A5 | PDF | 250 |
| 16 | 200dpi | COLOR | A5 | TIFF | 500 |

| RESOLUTION | COLOR SETTING | READING RANGE | DATA FORMAT |
|---|---|---|---|
| 4 0 0 d p i (400dpi) | COLOR(C) | A 4 (A4) | P D F (pdf) |
| 2 0 0 d p i (200dpi) | MONOCHROME(M) | A 5 (A5) | T I F F (tif) |

FIG.3

| PRIORITY | RESOLUTION | COLOR SETTING | READING RANGE | DATA FORMAT | ESTIMATED DATA AMOUNT |
|---|---|---|---|---|---|
| 1 | 4 0 0 d p i | MONOCHROME | A 4 | P D F | 2 0 0 |
| 2 | 4 0 0 d p i | MONOCHROME | A 4 | T I F F | 3 0 0 |
| 3 | 4 0 0 d p i | MONOCHROME | A 5 | P D F | 1 0 0 |
| 4 | 4 0 0 d p i | MONOCHROME | A 5 | T I F F | 1 5 0 |
| ⋮ | ⋮ | ⋮ | ⋮ | ⋮ | ⋮ |
| 1 3 | 2 0 0 d p i | COLOR | A 4 | P D F | 5 0 0 |
| 1 4 | 2 0 0 d p i | COLOR | A 4 | T I F F | 1 0 0 0 |
| 1 5 | 2 0 0 d p i | COLOR | A 5 | P D F | 2 5 0 |
| 1 6 | 2 0 0 d p i | COLOR | A 5 | T I F F | 5 0 0 |

FIG.4

| | | | | |
|---|---|---|---|---|
| RESOLUTION | ○ 400dpi | ○ 200dpi | ● NOT SPECIFIED | ~41 |
| COLOR SETTING | ● COLOR | ○ MONOCHROME | ○ NOT SPECIFIED | ~42 |
| READING RANGE | ○ A4 | ○ A5 | ● NOT SPECIFIED | ~43 |
| DATA FORMAT | ○ PDF | ○ TIFF | ● NOT SPECIFIED | ~44 |
| NUMBER OF PRODUCED FILES | ○1 ○2 ○3 ○4 ●5 ○6 ○7 | | ○ NOT SPECIFIED | ~45 |
| FILE UPPER LIMIT | ○250KB ○500KB ○750KB ●1000KB ○2000KB | | ○ NOT SPECIFIED | ~46 |

47 ~ [SCAN START]    [CANCEL]

FIG.5A

| STORING SYSTEM | | USB SYSTEM (USB) |
|---|---|---|
| STORING DESTINATION | FOLDER NAME | ¥IMAGE FOLDER |

FIG.5B

| STORING SYSTEM | | FTP SYSTEM (ftp) |
|---|---|---|
| STORING DESTINATION | ADDRESS OF FTP SERVER | ftp-server |
| | USER NAME | abcd |
| | PASSWORD | xxxx |
| | FOLDER NAME | ¥IMAGE FOLDER |

FIG.5C

| STORING SYSTEM | | E-MAIL SYSTEM (MAIL) |
|---|---|---|
| STORING DESTINATION | ADDRESS OF MAIL SERVER | mail-server |
| | USER NAME | abcd |
| | PASSWORD | xxxx |
| | E-MAIL ADDRESS | abcd@aa. bb |

FIG.6

| ANY TEXT | | PICT |
|---|---|---|
| DIGIT NUMBER OF SERIAL NUMBER | | 5 |
| DELIMITER | | - (HYPHEN) |
| TEXT SEQUENCE | ANY TEXT | 1 |
| | STORING SYSTEM TEXT | 2 |
| | PRODUCING CONDITION TEXT | 3 |
| | SERIAL NUMBER TEXT | 4 |
| WHETHER TO USE A DELIMITER | | USE |
| WHETHER TO ABBREVIATE A FILE NAME | | NOT ABBREVIATE |

IMAGE READING DEVICE, IMAGE READING METHOD AND READING CONTROL PROGRAM

CROSS-REFERENCE TO RELATED APPLICATION

This application claims priority from Japanese Patent Application No. 2008-020806, filed on Jan. 31, 2008, the entire subject matter of which is incorporated herein by reference.

TECHNICAL FIELD

Aspects of the present invention relate to an image reading device, an image reading method, and a reading control program.

BACKGROUND

An image reading device provides information used to select reading conditions suitable for transmission to a user and allows the user to select the reading conditions based on the information (see JP-A-2006-54842, for example).

However, even though such information used to select the reading conditions suitable for transmission are provided to the user, the selection has to be made inevitably prior to the reading. Therefore, it possibly occurs that the image data produced actually are not satisfactory to the user. In this case, the user has to repeat the reading operation until the user can acquire desired image data.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image reading device capable of acquiring desired image data in small number of times the user issues the reading command.

According to an exemplary embodiment of the present invention, there is provided an image reading device including: a reading unit which reads an original while the reading unit and the original are relatively moved, to produce a plurality of image data based on a plurality of producing conditions, respectively, in response to a reading command input one time, the plurality of producing conditions being different mutually; and a storing unit which stores the plurality of image data produced by the reading unit in a same storing destination.

According to another exemplary embodiment of the present invention, there is provided an image reading method including: reading an original with a reading unit while the reading unit and the original are relatively moved, to produce a plurality of image data based on a plurality of producing conditions, respectively, in response to a reading command input one time, the producing conditions being different mutually; and storing the plurality of image data in a same storing destination.

According to a further exemplary embodiment of the present invention, there is provided a computer-readable medium having a computer program stored thereon and readable by a computer, the computer program, when executed by the computer to perform operations including: instructing an image reading device to read an original once while a reading unit included in the image reading device and the original are moved relatively, in response to a reading command being input; producing a plurality of image data based on a plurality of producing conditions different mutually, from an image signal output from the image reading device; and storing the plurality image data in a same storing destination.

According to a further exemplary embodiment of the present invention, there is provided a computer-readable medium having a computer program stored thereon and readable by a computer, the computer program, when executed by the computer to perform operations including: instructing an image reading device to read an original while a reading unit included in the image reading device and the original are moved relatively, by a plurality of times based on a plurality of reading conditions, respectively, in response to one reading command being input, the plurality of reading conditions being different mutually; producing a plurality of image data, each based on an image signal output from the image reading device at one time; and storing the plurality of image data in a same storing destination.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

A first exemplary embodiment of the present invention will be explained with reference to FIG. 1 to FIG. 7.

(1. Electrical Configuration of an Image Reading Device)

Figure 1:
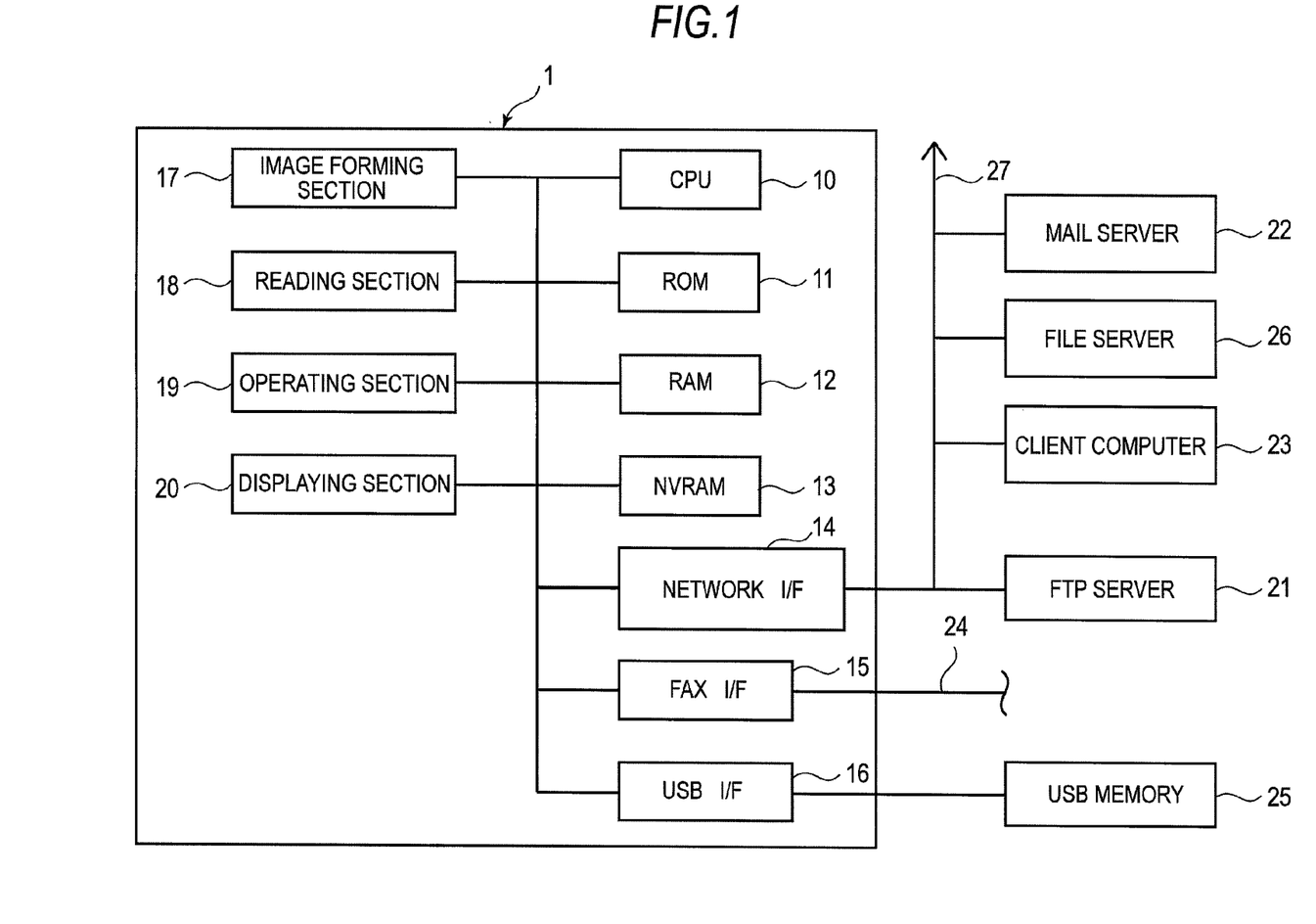
FIG. 1 is a block diagram of an image reading device according to an exemplary embodiment of the present invention.

FIG. 1 is a block diagram of a multifunction device 1 that is equipped with a scanner function, a printer function, a copying function, a facsimile function and the like according to an exemplary embodiment of the present invention.

The multifunction device 1 includes a central processing unit (CPU) 10, a read only memory (ROM) 11, a random access memory (RAM) 12, a nonvolatile random access memory (NVRAM) 13, an operating section 19, a displaying section 20, a reading section 18, an image forming section 17, a USB host interface 16, a network interface 14, a facsimile interface 15, and the like.

The CPU 10 controls respective sections of the multifunction device 1 by executing various programs stored in the ROM 11.

The reading section 18 is of the so-called flatbed type, and includes a line sensor such as a contact image sensor (CIS). The reading section 18 performs the reading in a main scanning area by using the line sensor while moving in the sub-scanning direction perpendicular to the extending direction of the line sensor (main scanning direction) relatively to the original. The reading section 18 may perform the reading while the original is moved by an automatic document feeder and the like and the line sensor is not moved. That is, the reading section 18 reads the original while the line sensor of the reading section 18 and the original are moved relatively. The reading section 18 converts analog sensor outputs output from the line sensor into digital image signals by means of an A/D conversion every time when it reads the main scanning area, applies predetermined processes such as the shading correction, the gamma correction, and the like to the digital image signals, and stores the resultant signals in the RAM 12.

The image forming section 17 forms images based on the image data on a recording medium such as a paper, or the like by a laser system, an ink-jet system, or the like.

Equipments such as an FTP server 21, a file server 26, a mail server 22, a client computer 23, and the like are connected to the network interface 14 via a telecommunication network 27 such as LAN, Internet, or the like.

A USB storage device such as a USB memory 25, a USB hard disc, or the like is removably connectable to the USB host interface 16.

The operating section 19 includes a plurality of buttons, and the like. The user inputs various settings, an original reading command, and the like by operating the operating section 19 while looking at a screen that is displayed on the displaying section 20, for example.

(2. Process Outline of the Image Reading Device)

When the user inputs the reading command by operating the operating section 19, the multifunction device 1 reads the original and produces plural image data under producing conditions that are different mutually. Then, the multifunction device 1 attaches a file name in accordance with a file name production rule such that the user can easily grasp the producing conditions, under which respective image data are produced, and stores the file name in the same storing destination set by the user. The procedures will be explained more specifically.

(3. Producing Conditions)

Herein, a producing condition denotes either the set values of set items that are used to determine the attribute of image data produced finally or combinations thereof. The attribute of image data is not limited to the attribute of an image quality, and may include the attribute of a reading range of the image data, the attribute of a data format, and the like.

One producing condition includes the set value for one set item or the set values for plural set items. When the set value for any one set item is different, such condition is regarded as another producing condition. It can be said that, when there are plural image data whose attributes are different mutually, these plural image data are produced under the mutually different producing conditions.

Figure 2:
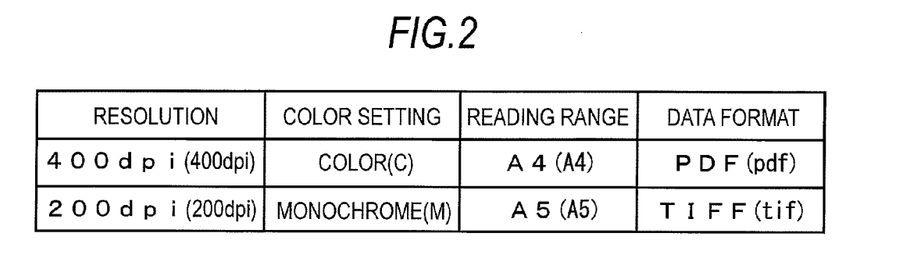
FIG. 2 is a schematic view showing set items according to the exemplary embodiment of the present invention.

FIG. 2 is a schematic view showing an example of set items and set values respectively set for the set items according to the first exemplary embodiment. In the first exemplary embodiment, the set items whose set values are contained in the producing conditions include a resolution, a color setting, a reading range, and a data format, as examples. Generally, the user often changes respective set values of the resolution, the color setting, the reading range, and the data format. Accordingly, if the set values for these set items are contained in the producing conditions, such a possibility becomes higher that any one of the image data meets the user's desire when plural image data whose producing conditions are different are produced.

In the production of the image data, set vales for items other than the above set items may be used. In this case, these set vales are used not as a variable value but a fixed value. For example, in the first exemplary embodiment, a set value of the tone number is not contained in the producing conditions. In this case, the image data are produced by using the fixed tone number.

The second and third lines in FIG. 2 indicate that the set values are set for the items given in the first line. As the resolution, one of "400 dpi" and "200 dpi" is selectable. As the color setting, one of "color" and "monochrome" is selectable. As the reading range, one of "A4" and "A5" is selectable. As the data format, one of "PDF format" and "TIFF format" is selectable. The content inside a bracket in each of the cells denotes the text that is correlated with the corresponding set value. These texts are used in generating the file name, and details thereof will be described later.

Figure 3:
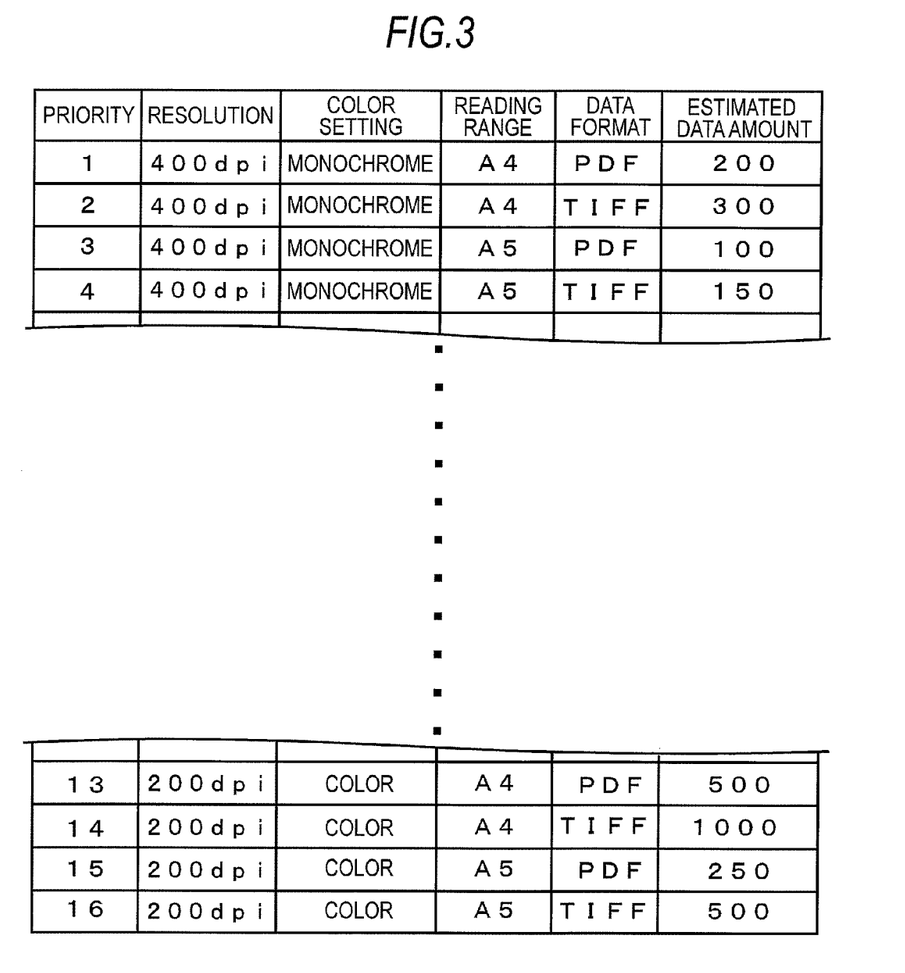
FIG. 3 is a schematic view showing producing conditions according to the exemplary embodiment of the present invention.

FIG. 3 is a schematic view showing all combinations of the set values for the above set items. In FIG. 3, the illustration of a part of combinations is omitted. In the multifunction device 1, all combinations shown in FIG. 3 are stored in advance in the ROM 11. In FIG. 3, one line corresponds to one producing condition. In each line, "resolution" in the second column, "color setting" in the third column, "reading range" in the fourth column, and "data format" in the fifth column are the set values.

Herein, "estimated data amount" in the sixth column is not the producing condition, and indicates roughly how large the amount of data will be produced when the image data are produced under the concerned producing conditions. When an upper limit is provided to the data amount of the image data to be produced, the "estimated data amount" is used to narrow the producing conditions into the producing conditions under which the image data smaller than the upper limit are produced. It will be explained how the value of the "estimated data amount" should be determined.

The image data are compressed by the compression format corresponding to the data format. Meanwhile, when plural image data representing the mutually different images are compressed, amounts of the image data do not always become equal after the compression even though respective amounts of data are equal before the compression. Therefore, when originals from which the images are produced are different, amounts of data of the produced image data are different even though the images are produced under the same producing condition. In the first exemplary embodiment, the plural image data are produced from plural originals under each producing condition, and then an average value of amounts of data obtained after plural produced images data are compressed is set as the "estimated data amount".

The "estimated data amount" gives merely an average value, and generally the amount of data of the produced image data becomes larger than the "estimated data amount" at a probability of 50%. Therefore, even though the "estimated data amount" is less than the upper limit, the amount of data of the produced image data does not always become the upper limit or less. In the first exemplary embodiment, it is assumed that, when the image data whose amount of data is larger than the upper limit are produced, such image data should be deleted.

Conversely, generally the amount of data of the produced image data becomes smaller than the "estimated data amount" at a probability of 50%. Therefore, even though the "estimated data amount" is more than the upper limit, the amount of data of the produced image data does not always become the upper limit or more. However, in the first exemplary embodiment, since the producing conditions that have "estimated data amount" in excess of the upper limit are excluded, all producing conditions under which the image data whose amount of data is less than the upper limit could be produced are not always used.

In the first exemplary embodiment, an average value is used as the "estimated data amount". However, a maximum value or an intermediate value may be used.

(4. Narrowing of the Producing Conditions)

When plural image data whose producing conditions are mutually different are produced, all producing conditions shown in FIG. 3 may be used. However, in some case, the user does not need the image data produced under all producing conditions. Therefore, in the first exemplary embodiment, the user can narrow the producing conditions to be used. The procedures will be explained specifically.

Figure 4:
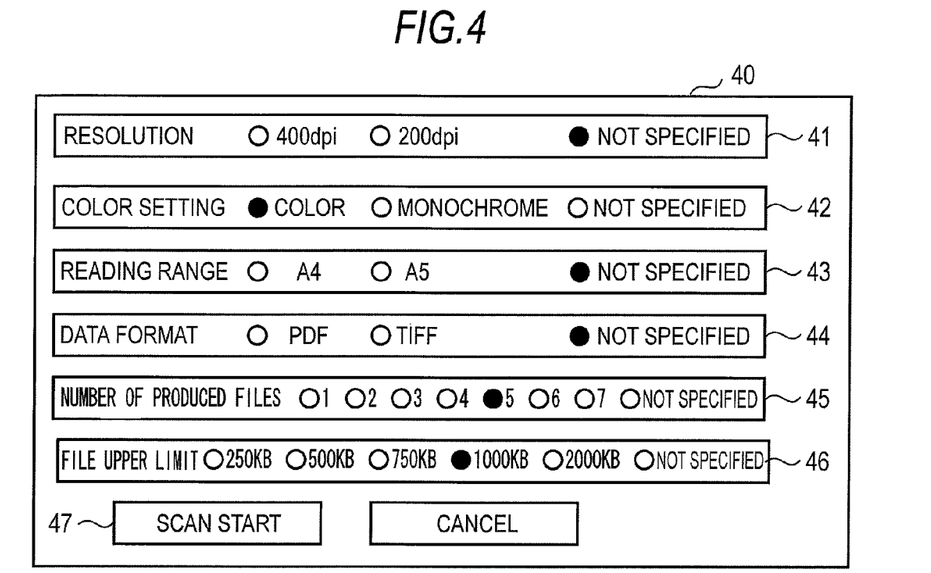
FIG. 4 is a schematic view of a screen according to the exemplary embodiment of the present invention.

FIG. 4 is a schematic view of a narrowing screen 40 used to narrow the producing conditions. This narrowing screen 40 is displayed on the display section 20. A resolution field 41 is a field for narrowing the producing conditions by the resolution. If 400 dpi is selected, the resolution is narrowed to 400 dpi in the producing conditions, and the resolution of 200 dpi is not used in the producing conditions. In other words, the resolution is fixed to 400 dpi. When the image data of 200 dpi are not needed, by selecting 400 dpi, the user can prevent the unnecessary image data of 200 dpi from being produced. Similarly, if the user selects 200 dpi, the resolution is fixed to 200 dpi. When "not specified" is selected, the narrowing of the producing conditions by using the resolution is not applied.

Similarly, a color setting field 42 is a field for narrowing the producing conditions by the color setting. Also, a reading range field 43 is a field for narrowing the producing conditions by the reading range. Also, a data format field 44 is a field for narrowing the producing conditions by the data format.

Also, a number-of-produced-files field 45 is a field for narrowing the producing conditions by the number of produced files. When the image data are produced too many, not only the useless image data are produced but also it takes much time to produce the image data. However, if the number of produced files is set, such uselessness can be reduced and also a time required for the production of the image data can be shortened.

In the illustrate example, one of numerals 1 to 7 and "not specified" are selectable as the number of produced files. In the first exemplary embodiment, it is assumed herein that the image data are stored in independent files respectively. Therefore, in the first exemplary embodiment, the image data of the same number as the number of selected files (hereinafter referred to as the "selected file number" hereinafter) are produced.

For narrowing the producing conditions by using the number of produced files, for example, a priority may be set previously to the producing conditions and then the producing conditions may be narrowed into the selected file number from the higher rank. Otherwise, all producing conditions shown in FIG. 3 may be displayed as a list and then the producing conditions may be narrowed by causing the user to select arbitrarily the producing conditions corresponding to the selected file number. In this case, the "priority" in the first column in FIG. 3 indicates an example of the priority set previously.

If an option other than "not specified" is selected in each of other items except the number of produced files, the files may be produced by smaller number than the selected number of produced files since the producing conditions are narrowed by these options.

A file upper limit field 46 is a field for narrowing the producing conditions by a file size. The user does not always need the image data whose amount of data is large. Moreover, in some cases, the user does not need the image data whose amount of data is large. When an upper limit can be set to the file size, such a case that the image data whose amount of data is large are produced uselessly can be prevented.

In the illustrated example, one of 250 kilobyte (KB), 500 KB, 750 KB, 1000 KB, 2000 KB, and "not specified" is selectable as the file size. When the file size is selected, the producing conditions are narrowed into the producing conditions which have the estimated data amount smaller than the selected file size is set. When "not specified" is selected, the narrowing is not performed with respect to the file size.

The file size that is set as an upper limit may not be selected from the options, but the user may specify arbitrary file size.

As described above, in the first exemplary embodiment, when the user specifies the conditions for narrowing the producing conditions, the multifunction device 1 narrows the producing conditions with the conditions specified by the user. That is, the multifunction device 1 automatically determines the producing conditions that satisfy the conditions specified by the user. As a result, it is not necessary that the user has to set plural producing conditions to produce plural image data whose producing conditions are different mutually, so that the production of plural image data whose producing conditions are different mutually can be facilitated.

(5. Setting of the Storing System and the Storing Destination)

The multifunction device 1 displays a set screen (not shown) used to set a storing system and a storing destination, on the displaying section 20. The user makes these settings by operating the operating section 19.

Figure 5A:
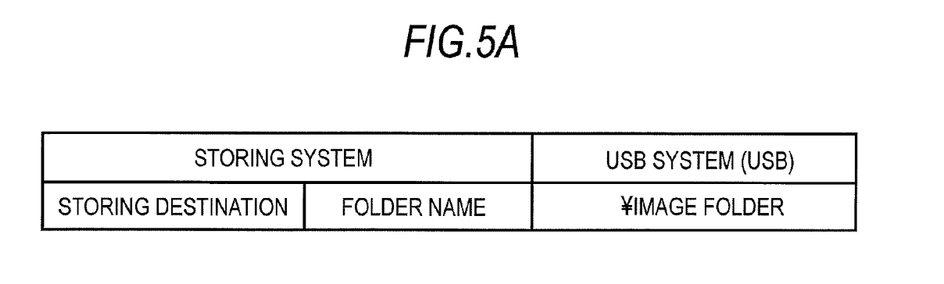
FIG. 5A is a schematic view of set contents according to the exemplary embodiment of the present invention.
Figure 5B:
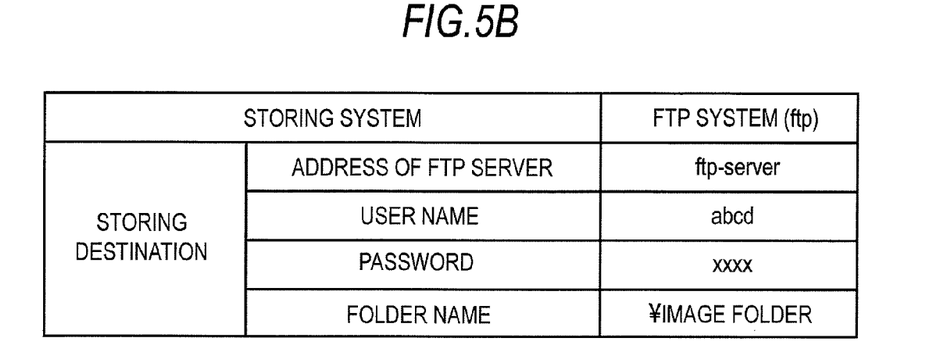
FIG. 5B is a schematic view of set contents according to the exemplary embodiment of the present invention.
Figure 5C:
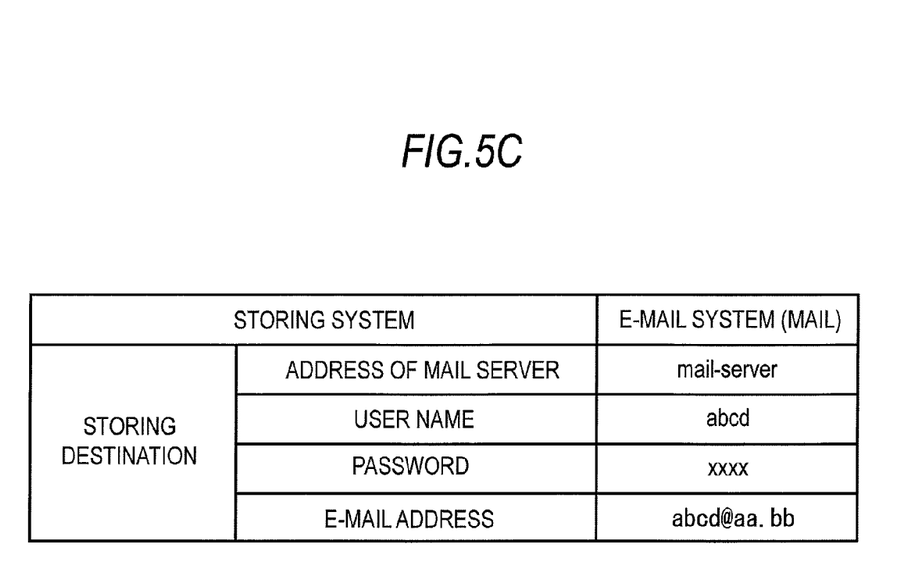
FIG. 5C is a schematic view of set contents according to the exemplary embodiment of the present invention.

FIG. 5A to FIG. 5C are schematic views showing examples of respective set contents.

In the "storing system", either of "USB system" in which the image file is stored in a USB storage device (FIG. 5A), "FTP system" in which the image file is stored in a FTP server or a file server (FIG. 5B), and "E-mail system" in which the image file is attached to the E-mail and transmitted to a mail server and then is transmitted from the mail server to a client computer (FIG. 5C) is set. The content in each bracket denotes the text that is correlated with the storing system. These texts are used to generate the file name, and details will be described later.

The specifics of the storing destination is set according to the storing system. In particular, when the USB system is selected as the storing system, a folder name of the USB storage device is set. When the FTP system is selected, an address (IP address or domain name) of the FTP server or the file server, a user name, a password, and a folder name are set.

When the E-mail system is selected, an address of the mail server, a user name, a password, and an E-mail address of the sending destination are set. It is noted that a plurality of storing destination may be set. In this case, the plurality of produced image data are stored in each of the storing destination.

(6. File Name Producing Rule)

When the produced image data are respectively stored in the independent files, it may be advantageous that, in order to facilitate the selection of the image data, the user could easily grasp which producing condition the image data stored in respective files are produced under.

Therefore, in the first exemplary embodiment, a file name including texts that correspond to a producing condition used to produce image data of a produced file is generated and attached to the produced file. An example of the file name producing rule is shown as follows.

"Any text"-"storing system text"-"producing condition text"-"serial number text". "extension"

The "any text" is a text that is specified arbitrarily by the user. The "storing system text" is a text that corresponds to the storing system. The "producing condition text" is a text that corresponds to the producing conditions and in which the texts (see FIG. 2) corresponding to the set values of the resolution, the color setting, and the reading range are coupled with a delimiter therebetween. Since the text that is correlated with the data format is used as an extension, such text is excluded from the "producing condition text".

The "serial number text" is a serial number attached to the file name in a predetermined number of digits. When the serial number does not fulfill the predetermined number of digits, the text in which a zero is placed on upper digits is used.

The "extension" is a text that corresponds to the data format of the image data stored in the concerned file. The "-(hyphen)" put in plural places is the delimiter.

Several examples of the file name that is generated according to the above file name production rule is shown below.

Pict-ftp-C-400dpi-A4-00001.pdf
Pict-ftp-C-200dpi-A4-00002.pdf
Pict-ftp-C-400dpi-A5-00003.pdf In this manner, since the file name including the text corresponding to the producing conditions used to produce the image data is attached to the image data, the user can grasp the producing conditions used to produce the image data from the file name. Therefore, the selection of the image data becomes easier.

The file name producing rule can be changed by setting. The setting of the file name producing rule will be explained below.

The multifunction device 1 displays the set screen (not shown) used to set the file name producing rule on the displaying section 20. The user makes these settings by operating the operating section 19.

Figure 6:
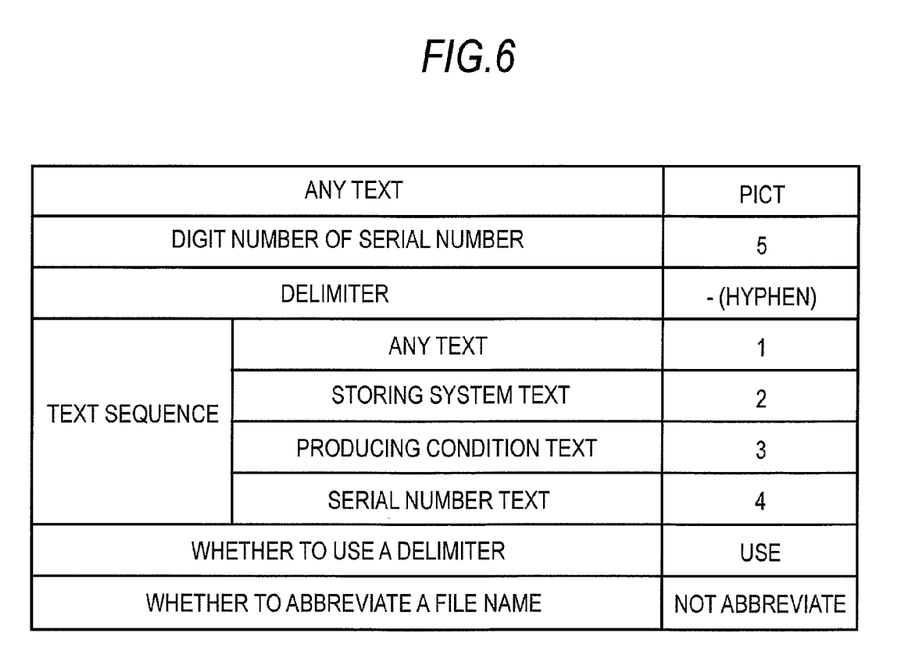
FIG. 6 is a schematic view of set contents according to the exemplary embodiment of the present invention.

FIG. 6 is a schematic view showing an example of the set contents. In the set contents of "any text", any text to be included in the file name is set.

In the "digit number of serial number", the digit number of the serial number to be included in the file name is set.

In the "delimiter", the character used as a punctuation of the text is set. For example, "_(underline)", ",(comma)", "( )(parentheses)", "-(hyphen)", and the like cab be set.

To each of "any text", "storing system text", "producing condition text", and "serial number text" in "text sequence", the digit indicating the order used to couple these texts is set sequentially. In place of these digits, "not used" can be set. When "not used" is set, the concerned text is not included in the file name.

In "whether to use a delimiter", either of "use" and "not use" indicating whether to use the delimiter is set.

In "whether to abbreviate a file name", either of "abbreviate" and "not abbreviate" indicating whether to abbreviate the file name is set. The abbreviation of the file name will be explained below.

In the example of the above file name, it can be seen from the file name that the color setting of the image data stored in all files is "color". That is, a text of "C" does not indicate the feature of a particular file among plural files that are produced by one reading command.

In this case, the file name can be abbreviated by removing a text portion of "C", which is common to all files, from the "producing condition text" and then including only a text portion, which is different from other producing conditions, in the file name. The followings show several examples.

Pict-ftp-400dpi-A4-00001.pdf
Pict-ftp-200dpi-A4-00002.pdf
Pict-ftp-400dpi-A5-00003.pdf As the result that the common text portion "C" is removed, only the text portion corresponding to the resolution and the text portion corresponding to the reading range out of the "producing condition text" are included in the file name.

In this manner, when only the text portion different from other producing conditions is included in the file name, the file name can be abbreviated. Therefore, such file name is more easy for the user to grasp the feature of the producing conditions used to produce the image data stored in the file, and additionally, the selection of the image data is made easier.

In this case, instead of the exclusion of all portions of the common texts, at least a part of the text portions that are common to the producing condition texts of all image data may be excluded from the producing condition texts of respective image data. In other words, not all text portions, which are common to all files, out of the producing condition texts are excluded, but only a part of the common text portions may be excluded. For example, it is assumed that the file names are given as follows before the abbreviation.

Pict-ftp-C-400dpi-A4-00001.pdf
Pict-ftp-C-200dpi-A4-00002.pdf

Here, "C" and "A4" are the text portions common to all files. In this case, not both "C" and "A4" may be excluded, but only "C" may be excluded as shown below, for example.

Pict-ftp-400dpi-A4-00001.pdf
Pict-ftp-200dpi-A4-00002.pdf (7. Process in the Image Reading Device)

Next, a process of producing the image data when the multifunction device 1 reads the original will be explained below.

Herein, explanation will be made by taking as an example the case where plural image data are produced by reading the original only once in response to one reading command. When plural image data are produced by one reading operation, plural image data can be produced in a shorter time than that in the case where the reading operation is executed every time when the image data are produced. Also, when the reading operation is executed only once in response to one reading command, a reading time can be shortened more.

Figure 7:
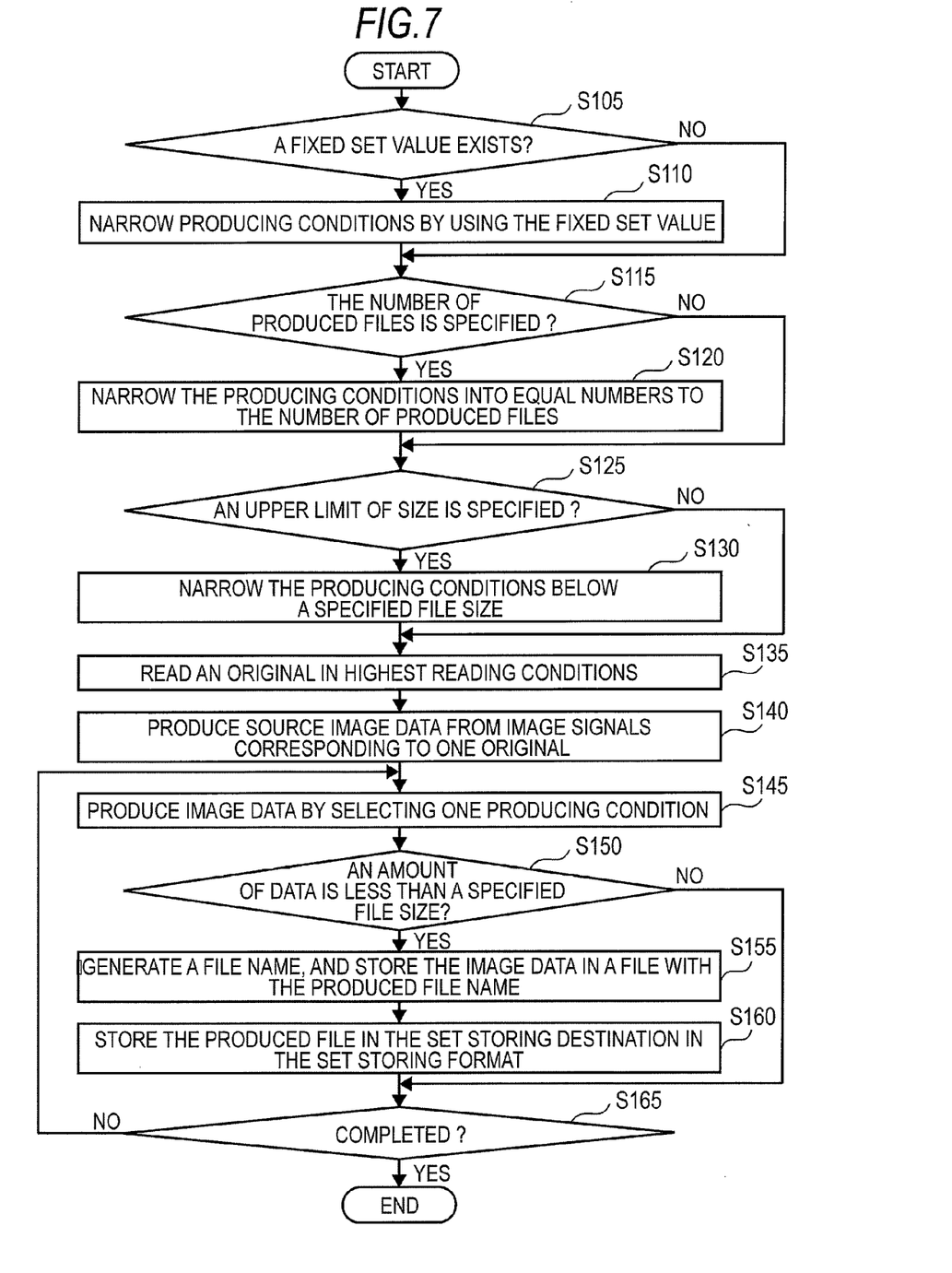
FIG. 7 is a flowchart according to the exemplary embodiment of the present invention.

FIG. 7 is a flowchart of the process of producing the image data when the multifunction device 1 reads the original. This process starts in response to that the user inputs the reading command by pressing a [scan start] button 47 on the narrowing screen 40 described above.

At operation S105, the CPU 10 determines whether the item, for which the set value is fixed, exists in the resolution, the color setting, the reading range, and the data format. In other words, the CPU 10 determines whether the item, for which any set value except "not specified" is selected, exists in the resolution, the color setting, the reading range, and the data format in the screen shown in FIG. 4. If the CPU 10 determines that the item for which the set value is fixed exits, the process proceeds to operation S110. In contrast, if the item for which the set value is fixed does not exist, the process proceeds to operation S115.

At operation S110, the CPU 10 narrows the producing conditions by using the fixed set value.

At operation S115, the CPU 10 determines whether the number of the produced files is specified. In other words, the CPU 10 determines whether any set value except "not specified" is selected in the number of the produced files. If the CPU 10 determines that the set value is specified in the number of the produced files, the process proceeds to operation S120. In contrast, if the set value is not specified in the number of the produced files, the process proceeds to operation S125.

At operation S120, the CPU 10 narrows the producing conditions into the equal numbers to the number of produced files. At operation S110, if the producing conditions are narrowed, the narrowed producing conditions are further narrowed by using the number of the produced files.

At operation S125, the CPU 10 determines whether an upper limit of size is specified. In other words, the CPU 10 determines whether any set value except "not specified" is selected in the size upper limit. If the CPU 10 determines that the set value is specified in the size upper limit, the process proceeds to operation S130. In contrast, if the set value is specified in the size upper limit, the process proceeds to operation S135.

At operation S130, the CPU 10 narrows the producing conditions into the conditions which have the estimated data amount smaller than the specified file size. At operation S110 or operation S120, if the producing conditions are narrowed, the narrowed producing conditions are further narrowed by using the estimated data amount.

At operation S135, the CPU 10 reads the original in the highest reading conditions by controlling respective sections of the multifunction device 1.

Herein, the "reading conditions" denote the set values for the items used to control the reading section 18 out of the producing conditions or their combination. In the first exemplary embodiment, the resolution, the color setting, and the reading range are used to control the reading section 18.

The "highest reading conditions" denote a combination of the set value by which the image data of a highest image quality are produced among the narrowed producing conditions and the set value by which the largest reading range is given among the narrowed producing conditions. Herein, in FIG. 2, in the resolution and the color setting, the set values on the second line can produce the image data of higher image quality than the set values on the lowest line. Similarly, in the reading range, the set value on the second line can give the larger reading range than the set value on the lowest line.

For example, when the producing conditions in which 400 dpi is set are not included in the narrowed producing conditions and the resolution of 200 dpi included in all the narrowed producing conditions, the resolution of 200 dpi is used as the highest reading condition. This is because, when the original is read at 400 dpi, the resolution is used wastefully.

When the original is read in the highest reading conditions, the image data under all producing conditions can be produced by one reading operation. Therefore, a time required for the reading can be shortened in contrast to the case where the original is read at every producing condition.

Herein, a combination of the set values indicated on the second line in FIG. 2 may be always employed as the highest reading conditions.

At operation S140, the CPU 10 produces image data acting as a source (hereinafter referred to as "source image data") from image signals corresponding to one original, which are stored in the RAM 12 by reading the original at operation S135.

At operation S145, the CPU 10 selects one producing condition from the narrowed producing conditions. Then, the CPU 10 produces the image data under the selected producing conditions by applying the processes to the source image data produced at operation S140 based on the selected producing conditions.

The process of converting the resolution of the image from 400 dpi to 200 dpi, the process of converting the image from color to monochrome, and the like are the known processes. Therefore, their detailed explanation will be omitted herein.

At operation S150, the CPU 10 determines whether an amount of data of the image data produced at operation S145 is less than the specified file size. If the amount of data of the produced image data is larger than the specified file size, the CPU 10 deletes such image data, and the process proceeds to operation S165. In contrast, if an amount of data of the produced image data is smaller than the specified size, the process proceeds to operation S155.

At operation S155, the CPU 10 generates the file name in accordance with the above-described file name producing rule, and then stores the image data produced at operation S145 in the file to which this generated file name is attached.

At operation S160, the CPU 10 stores the produced file in the set storing destination in the set storing format.

At operation S165, the CPU determines whether the selection of all narrowed producing conditions is completed. If the selection is completed, the process ends. If the selection is not completed, the process goes back to operation S145. Then, the processes are repeated until the process ends.

With the above, the process is completed. In the first exemplary embodiment, it is not allowed to change the storing destination during this process. Therefore, the image data produced at operation S145 are stored in all same storing destinations.

In this event, when the FTP system or the E-mail system is selected as the storing system, the produced file may not be stored in the storing destination at timing of producing file at operation S160, but the produced file may be stored collectively after operation S165.

According to the multifunction device 1 in the first exemplary embodiment, plural image data whose producing conditions are different mutually are stored not in different storing destinations but in the same storing destination. Therefore, the user can utilize these plural image data in the storing destination. Accordingly, when one image data is satisfactory to the user even though other image data are not satisfactory to the user, there is no need that the user executes the operation once again to input the reading command. As a result, according to the multifunction device 1, the user can acquire the desired image data in small number of times the user issues the reading command, and in many cases the user can acquire the desired image data only by issuing one reading command.

Second Exemplary Embodiment

In the second exemplary embodiment, an image reading device cooperates with a computer to produce the image data whose producing conditions are different mutually.

Figure 8:
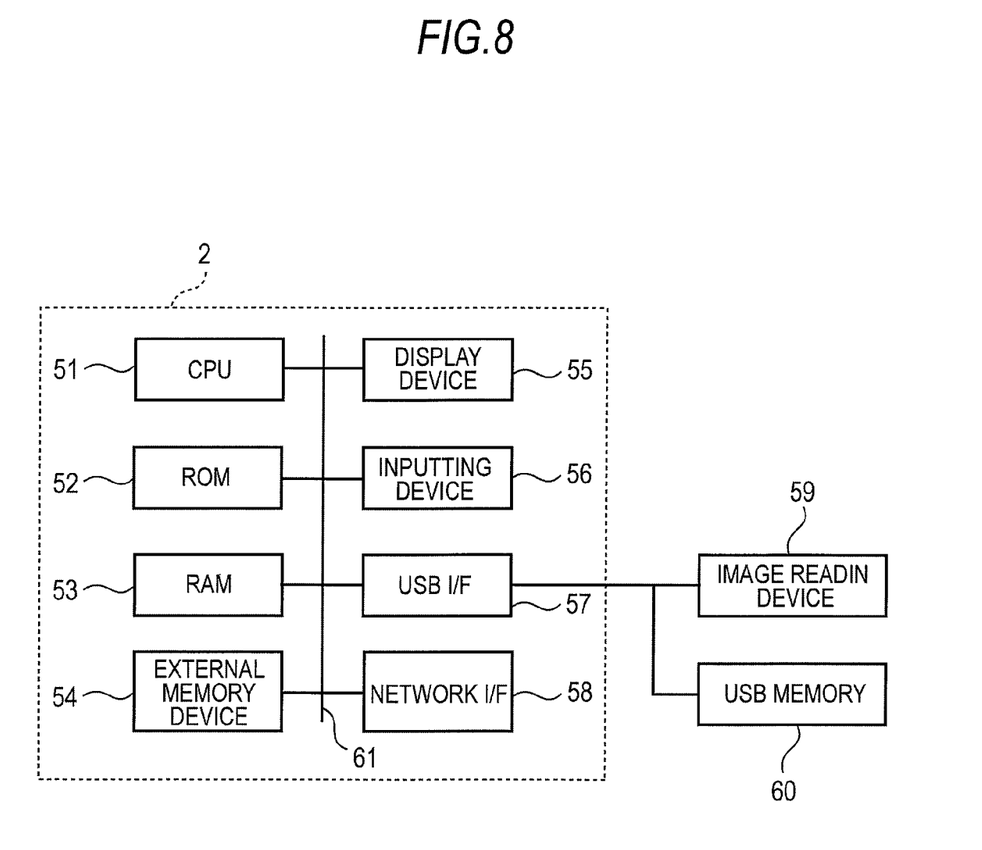
FIG. 8 is a block diagram according to another exemplary embodiment of the present invention.

FIG. 8 is a block diagram showing a computer 2 and an image reading device 59 operated under control of the computer 2.

The computer 2 is the so-called personal computer, and is configured by a CPU 51, a ROM 52 and a RAM 53, an external memory device 54 using a hard disc, an optical disc, or the like as a memory medium, a display device 55 such as LCD, CRT, or the like, an inputting device 56 such as a keyboard, a mouse, or the like, a USB host interface 57 to which a USB storage device such as a USB memory 60, or the like, an image reading device 59 compatible with the USB connection, or the like, a network interface 58, a bus 61 for connecting these devices, and others.

The computer 2 controls the image reading device 59 by executing a scanner driver. Also, the computer 2 that executes the scanner driver to display a screen such as the abovementioned narrowing screen 40 on the display device 55. The user inputs various settings, the original reading command, and the like by operating the inputting device 56 while looking at the displayed screen.

The image reading device 59 is the flat head-type image reading device that is publicly known and operates under the computer 2. The image reading device 59 is equipped with the line sensor such as the CIS, or the like, and A/D converts the analog sensor output from the line sensor into the digital image signals. Also, the image reading device 59 applies predetermined processes such as the shading correction, the gamma correction, and the like to the image signals, and then output resultant signals to the computer 2. The image reading device 59 may include an automatic document feeder which feeds an original and the line sensor may read the original while the original being fed. That is, the image reading device 59 reads the original while the line sensor of the image reading device and the original are moved relatively.

Next, an operation of the computer 2 will be explained below.

Figure 9:
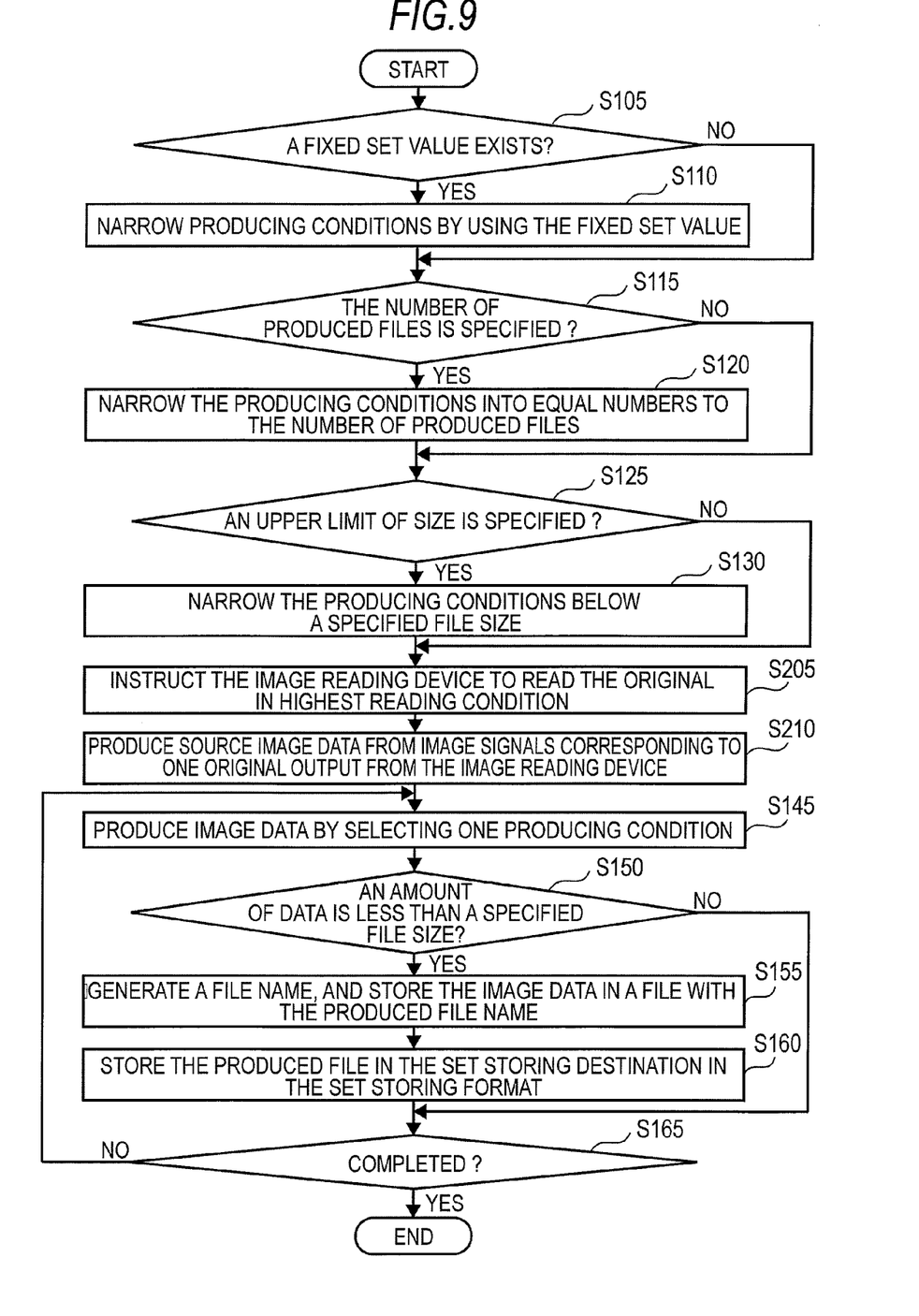
FIG. 9 is a flowchart according to the other exemplary embodiment of the present invention.

FIG. 9 is a flowchart showing the process of the computer 2 that operates the scanner driver. This process is started in response to that the user inputs the reading command by operating the inputting device 56. Herein, the same reference symbols are affixed to the same processes as the processes made by the CPU 10 in the first exemplary embodiment, and their explanation will be omitted herein. The process in the second exemplary embodiment is substantially identical to that in the first exemplary embodiment except for the following aspects. That is, the operations performed by the CPU 10 in the first exemplary embodiment are performed by the CPU 51 of the computer 2 in the second exemplary embodiment. Additionally, in stead of operations S135 and S140 in the first exemplary embodiment, operation S205 and operation S210 are performed in the second exemplary embodiment.

Specifically, at operation S205, the CPU 51 instructs the image reading device 59 to read the original under the highest reading conditions. The image reading device 59, when instructed to read the original, reads the original under the highest reading conditions, and outputs the image signals to the computer 2.

At operation S210, the CPU 51 produces source image data based on the image signals corresponding to one original output from the image reading device 59 at operation S205.

Third Exemplary Embodiment

In the third exemplary embodiment, the image reading device 59 cooperates with the computer 2 to produce the image data whose producing conditions are different mutually. Additionally, in the third exemplary embodiment, when the reading command is input, the computer 2 does not instruct the image reading device 59 to read the original once, but the computer 2 instructs the image reading device 59 to read the original every producing condition.

Figure 10:
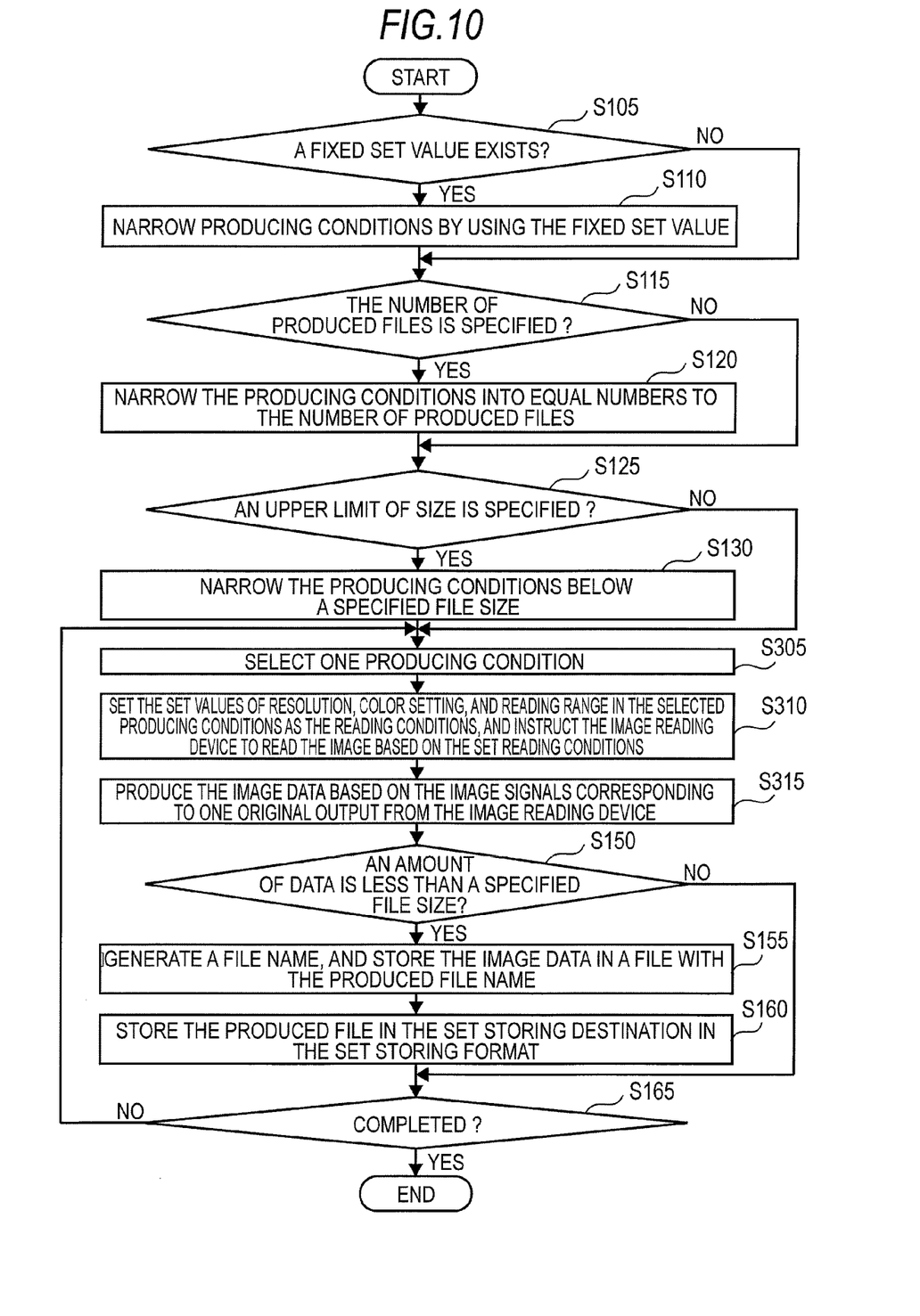
FIG. 10 is a flowchart according to another exemplary embodiment of the present invention.

FIG. 10 is a flowchart showing the process of the computer 2 to execute a reading control program according to the third exemplary embodiment. This process is started in response to that the user inputs the reading command by operating the inputting device 56. Herein, the same reference symbols are affixed to the same processes as the processes made by the CPU 10 in the first exemplary embodiment, and their explanation will be omitted herein. The process in the third exemplary embodiment is substantially identical to that in the second exemplary embodiment except for the following aspects. That is, in stead of operations S205, S210 and S145 in the second exemplary embodiment, operation S305, S310 and S315 are performed in the third exemplary embodiment.

At operation S305, the CPU 51 selects one producing condition from the narrowed producing conditions.

At operation S310, the CPU 51 sets the set values of the resolution, the color setting, and the reading range of the selected producing conditions as a reading condition, and instructs the image reading device 59 to read the image under the set reading condition. The image reading device 59, when instructed to read, reads the original under the set reading conditions and outputs the image signals to the computer 2.

At operation S315, the CPU 51 produces image data based on the image signals corresponding to one original output from the image reading device 59 at operation S310, and applies the process to the produced image data based on the set values except the set value, which are used as the reading conditions, out of the set values of the selected producing conditions. Accordingly, the CPU 51 produces the image data under the selected producing conditions.

Other Exemplary Embodiment

While the present invention has been shown and described with reference to certain exemplary embodiments thereof, it will be understood by those skilled in the art that various changes in form and details may be made therein without departing from the spirit and scope of the invention as defined by the appended claims.

(1) In the above-described exemplary embodiments, explanation is made while taking the resolution, the color setting, the reading range, and the data format as examples. But the number of tones, the compression setting, the image processing, the color space, and the like. may be set as the set items. Here, the "compression setting" denotes a compression level applied when the data are compressed in the compression format corresponding to the data format, or the like. The "image processing" denotes the image processing that applies a visual effect such as sharpening, blurring, or the like to the image or parameters applied to the image processing, or the like.

(2) In the above-described exemplary embodiments, explanation is made by taking the case where the produced image data are stored in the independent files respectively as an example. But plural image data can be stored in the TIFF file, for example. Therefore, plural produced image data may be stored in one file.

(3) In the above-described exemplary embodiments, explanation is made by taking the PDF format or the TIFF format as the data format for the set value, as an example. But the BMP format may be used as the data format, or the JPEG format may be used.

(4) In the above-described exemplary embodiments, the upper limit of file size is specified to narrow the producing conditions. Similarly, a desired file size may be specified to narrow the producing conditions. In this case, the producing conditions are narrowed into the producing conditions which have the estimated data amount within a specific range around the desired file size. For example, if 500 KB is selected as the desired file size, the producing conditions which have the estimated data amount within a range from 400 KB to 600 KB may be selected as the narrowed producing conditions.

The present invention provides illustrative, non-limiting embodiments as follows.

(1) An image reading device includes: a reading unit which reads an original to produce a plurality of image data based on a plurality of producing conditions, respectively, in response to a reading command input one time, the plurality of producing conditions being different mutually; and a storing unit which stores the plurality of image data produced by the reading unit in a same storing destination.

According to the configuration of (1), the plurality of image data whose producing conditions are different mutually are not stored in different storing destinations respectively but in the same storing destination, and thus the user can utilize plural image data in the concerned storing destination. Therefore, when one image data is satisfactory to the user even though other image data are not satisfactory to the user, there is no need that the user executes the operation once again to input the reading command. As a result, according to the configuration of (1), the user can acquire desired image data in small number of times the user issues the reading command.

(2) In the image reading device of (1), the storing unit may generate a file name for each of the plurality of image data, the file name including a text corresponding to the producing condition for the image data.

According to the configuration of (2), the user can grasp the producing conditions used to produce the image data from the file name, and thus the choice of the image data is made easy.

(3) In the image reading device of (2), each of the producing conditions may include a plurality of set values for a plurality of items, and the storing unit may generate the file names by excluding at least a part of text portions corresponding to a set value common among the plurality of producing conditions for the plurality of image data.

According to the configuration of (3), at least a part of the common text portion is excluded from the file name. Therefore, the user can easily grasp the feature of the producing conditions, and in turn the choice of the image data is made easier.

(4) The image reading device of any one of (1) to (3), may further include an upper limit setting unit which sets an upper limit of an amount of data per one image data. The reading unit may produce only the image data having an amount of data smaller than the upper limit set by the upper limit setting unit.

The user does not always need the image data whose amount of data is large, and on the contrary the user does not need the image data whose amount of data is large in some cases. According to the configuration of (4), since an upper limit can be set to the file size, such an event can be prevented that the image data whose amount of data is large are produced uselessly.

The image reading device of any one of (1) to (3), may further include a size setting unit which sets a desired amount of data per one image data. The reading unit produces only the image data having an amount of data within a range defined by the desired amount.

(5) The image reading device of any one of (1) to (4), may further include a number-of-image data setting unit which sets a number of produced image data. The reading unit may produce the image data by the number set by the number-of-image data setting unit.

When the image data are produced too much, not only the useless image data are produced but also it takes much time to produce the image data. According to the configuration of (5), since the number of produced files can be set, such uselessness can be reduced and also a time required for the production of the image data can be shortened.

(6) In the image reading device of any one of (1) to (5), the reading unit may automatically determine the plurality of producing conditions for the plurality of image data.

According to the configuration of (6), there is no need that the user should set plural producing conditions to produce plural image data whose producing conditions are different mutually. Therefore, the production of plural image data whose producing conditions are different mutually can be facilitated.

In the image reading device of (6), each of the producing conditions may include a plurality of set values for a plurality of items, and the reading unit may automatically determine the plurality of producing conditions by changing at lease one of the set values for the plurality of items.

(7) In the image reading device of any one of (1) to (6), the producing conditions may include a set value for at least one of items including a resolution, a color setting, a reading range, a data format, and a tone number.

Usually the user changes often the set values of the resolution, the color setting, the reading range, the data format, and the tone number. According to the configuration of (7), the set value in at least one item out of these items is contained in the producing conditions. Therefore, such a possibility becomes high that any image data out of plural produced image data meets the user's request. As a result, such a possibility can be reduced that all image data do not meet the user's request and the user has to input the reading command once again.

(8) In the image reading device of any one of (1) to (7), each of the producing conditions may include a plurality of set values for a plurality of items, the image reading device may further include a selecting unit which selects an item, a set value for which is fixed, from among the plurality of items, and the reading unit may produce the plurality of image data while fixing the set value for the item selected by the selecting unit.

The item that the user does not want to change is contained in the producing conditions. According to the configuration of (8), plural image data are produced while fixing the set value in the chosen item. Therefore, such a situation can be reduced that the image data unnecessary for the user are produced.

(9) In the image reading device of any one of (1) to (8), the reading unit may produce the plurality of image data by reading the original once.

According to the configuration of (9), plural image data are produced by one reading operation. Therefore, plural image data can be produced in a shorter time than that in the case where the reading is executed every time the image data are produced.

(10) In the image reading device of (9), the reading unit may perform a reading operation on the original only once in response to the reading command.

According to the configuration of (10), the reading operation is executed only once in response to one reading command. Therefore, a time required for the reading can be shortened much more.

(11) An image reading method includes: reading an original to produce a plurality of image data based on a plurality of producing conditions, respectively, in response to a reading command input one time, the producing conditions being different mutually; and storing the plurality of image data in a same storing destination.

According to the configuration of (11), the user can acquire desired image data in small number of times the user issues the reading command.

(12) A computer-readable medium has a computer program stored thereon and readable by a computer, the computer program, when executed by the computer to perform operations including: instructing an image reading device to read an original once in response to a reading command being input; producing a plurality of image data based on a plurality of producing conditions different mutually, from an image signal output from the image reading device; and storing the plurality image data in a same storing destination.

According to the configuration of (12) the user can acquire desired image data in small number of times the user issues the reading command.

(13) A computer-readable medium has a computer program stored thereon and readable by a computer, the computer program, when executed by the computer to perform operations including: instructing an image reading device to read an original by a plurality of times based on a plurality of reading conditions, respectively, in response to one reading command being input, the plurality of reading conditions being different mutually; producing a plurality of image data, each based on an image signal output from the image reading device at one time; and storing the plurality of image data in a same storing destination.

According to the configuration of (13), the user can acquire desired image data in small number of times the user issues the reading command.

What is claimed is:

1. An image reading device comprising:
a reading unit configured to read an original while the reading unit and the original are relatively moved, to produce a plurality of image data based on a plurality of producing conditions, respectively, in response to a reading command input one time, the plurality of producing conditions being mutually different, wherein each of the producing conditions includes a plurality of set values for a plurality of items; and
a storing controller configured to store the plurality of image data produced by the reading unit in a same storing destination including generating a file name for each of the plurality of image data, the file name including text corresponding to the producing condition for the image data and excluding text corresponding to a set value common among the plurality of producing conditions for the plurality of image data.

2. The image reading device according to claim 1, wherein the image reading device is configured to set an upper limit of an amount of data per one image data,
wherein the reading unit produces only image data having an amount of data smaller than the set upper limit.

3. The image reading device according to claim 1, wherein the image reading device is configured to set a desired amount of data per one image data,
wherein the reading unit produces only image data having an amount of data within a range defined by the desired amount.

4. The image reading device according to claim 1, wherein the image reading device is configured to set a number of produced image data,
wherein the reading unit produces the image data by the set number of produced image data.

5. The image reading device according to claim 1, wherein the reading unit automatically determines the plurality of producing conditions for the plurality of image data.

6. The image reading device according to claim 5,
wherein the reading unit automatically determines the plurality of producing conditions by changing at least one of the set values for the plurality of items.

7. The image reading device according to claim 1, wherein the plurality of set values includes a set value for at least one of: a resolution, a color setting, a reading range, a data format, and a tone number.

8. The image reading device according to claim 1,
the image reading device is configured to select an item, a set value for which is fixed, from among the plurality of items,
wherein the reading unit produces the plurality of image data while fixing the set value for the item selected by the selecting unit.

9. The image reading device according to claim 1, wherein the reading unit produces the plurality of image data by reading the original once.

10. The image reading device according to claim 9, wherein the reading unit performs a reading operation on the original only once in response to the reading command.

11. An image reading method comprising:
reading an original with a reading unit while the reading unit and the original are relatively moved, to produce a plurality of image data based on a plurality of producing conditions, respectively, in response to a reading command input one time, the producing conditions being mutually different, wherein each of the producing conditions includes a plurality of set values for a plurality of items; and
storing the plurality of image data in a same storing destination including generating a file name for each of the plurality of image data, the file name including text corresponding to the producing condition for the image data and excluding text corresponding to a set value common among the plurality of producing conditions for the plurality of image data.

12. A non-transitory computer-readable medium having a computer program stored thereon and readable by a computer, the computer program, when executed by the computer to perform operations comprising:
instructing an image reading device to read an original once while a reading unit included in the image reading device and the original are moved relatively, in response to a reading command being input;
producing a plurality of image data based on a plurality of producing conditions different from each other, from an image signal output from the image reading device, wherein each of the producing conditions includes a plurality of set values for a plurality of items; and
storing the plurality of image data in a same storing destination including generating a file name for each of the plurality of image data, the file name including text corresponding to the producing condition for the image data and excluding text corresponding to a set value common among the plurality of producing conditions for the plurality of image data.

13. A non-transitory computer-readable medium having a computer program stored thereon and readable by a computer, the computer program, when executed by the computer to perform operations comprising:
   instructing an image reading device to read an original while a reading unit included in the image reading device and the original are moved relatively, by a plurality of times based on a plurality of reading conditions, respectively, in response to one reading command being input, the plurality of reading conditions being mutually different, wherein the reading unit automatically determines the plurality of producing conditions for the plurality of image data;
   producing a plurality of image data, each based on an image signal output from the image reading device at one time; and
   storing the plurality of image data in a same storing destination.

14. An image reading device comprising:
a reading unit configured to:
   read an original while the reading unit and the original are relatively moved,
   automatically determine a plurality of producing conditions for a plurality of image data, and
   produce the plurality of image data based on the plurality of producing conditions, respectively, in response to a reading command input one time, the plurality of producing conditions being mutually different; and
a storing controller configured to store the plurality of image data produced by the reading unit in a same storing destination.

15. An image reading method comprising:
reading an original with a reading unit while the reading unit and the original are relatively moved, to produce a plurality of image data based on a plurality of producing conditions, respectively, in response to a reading command input one time, the producing conditions being mutually different, wherein the reading unit is further configured to automatically determine the plurality of producing conditions for the plurality of image data; and
storing the plurality of image data in a same storing destination.

* * * * *